US006761079B2

(12) United States Patent
Tondorf et al.

(10) Patent No.: US 6,761,079 B2
(45) Date of Patent: Jul. 13, 2004

(54) SECURING ARRANGEMENT FOR TRANSPORTING AND MOUNTING A MEASURING SYSTEM, AND SUCH A MEASURING SYSTEM

(75) Inventors: Sebastian Tondorf, Waging am See (DE); Stefan Kühnhauser, Taching (DE); Peter Niedermeier, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 120 days.

(21) Appl. No.: 10/079,922

(22) Filed: Feb. 20, 2002

(65) Prior Publication Data

US 2002/0124665 A1 Sep. 12, 2002

(30) Foreign Application Priority Data

Feb. 20, 2001 (DE) ........................................ 101 09 909

(51) Int. Cl.[7] .............................................. G01D 21/00
(52) U.S. Cl. ...................................................... 73/866.5
(58) Field of Search ............................ 73/865.8, 866.5; 250/231.1; 33/571, 706–708; 356/498; 324/207.24, 207.25

(56) References Cited

FOREIGN PATENT DOCUMENTS

DE           30 20 003           12/1981
DE           199 18 654          10/2000

OTHER PUBLICATIONS

Pending Patent application Assigned to Dr. Johannes Heidenhain GmbH: Ser. No.: 09/548,478, Filing Date: Apr. 13, 2000, Inventor: Josef Muller et al.

Pollermann, Max, "Bauelemente der Physikalischen Technik", Springer–Verlag, Berlin, Gottingen and Heidelberg, 1955, pp. 92–95.

*Primary Examiner*—Robert Raevis
(74) *Attorney, Agent, or Firm*—Brinks Hofer Gilson & Lione

(57) ABSTRACT

A securing arrangement for transporting and mounting a measuring system used for the determination of the position of two components, which can be moved relative to each other. The securing arrangement includes a base body, which is linearly displaced along a displacement direction via a guide track of a support body of a measuring graduation of the measuring system and is fixed in place on the support body by clamping forces in order to maintain a mounting base that fastens a scanning device to one of the two components in a desired position in relation to the support body. A service element is provided on the base body and having an operating section for introducing and/or canceling the clamping forces, wherein the operating section of the service element laterally protrudes past a surface of the base body which faces away from the support body and is laterally bordered by a lateral edge, when the base body is fastened on the support body.

22 Claims, 2 Drawing Sheets

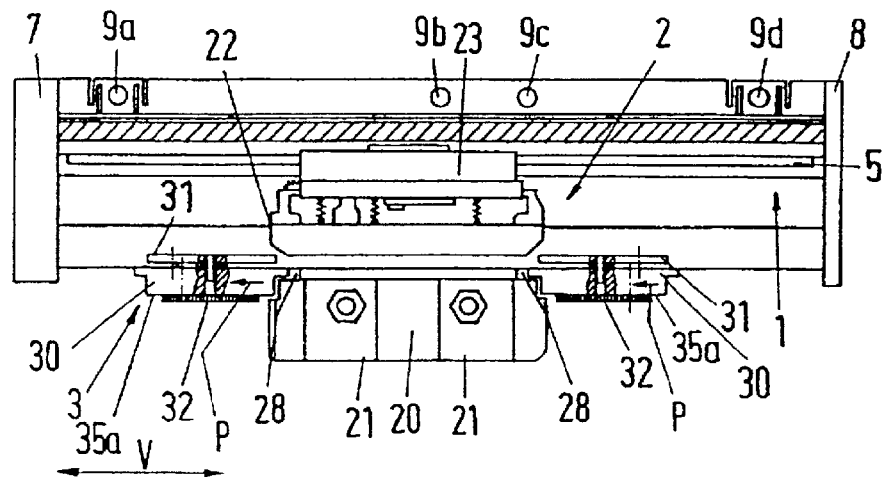
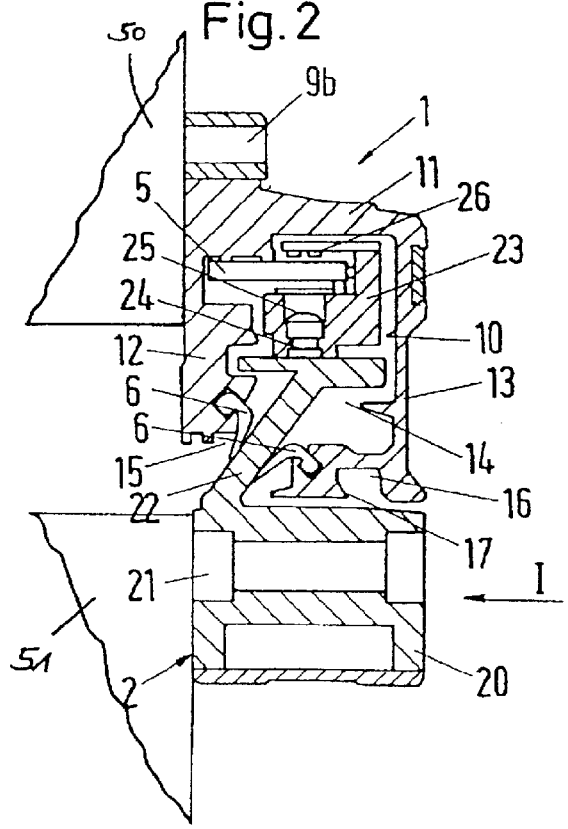
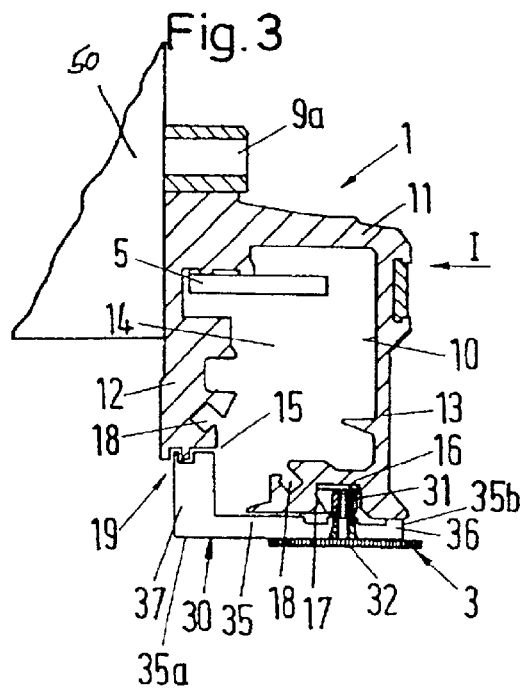

SECURING ARRANGEMENT FOR TRANSPORTING AND MOUNTING A MEASURING SYSTEM, AND SUCH A MEASURING SYSTEM

Applicants claim, under 35 U.S.C. §119, the benefit of priority of the filing date of Feb. 20, 2001 of a German patent application, copy attached, Ser. No. 101 09 909.6, filed on the aforementioned date, the entire contents of which is incorporated herein by reference.

BACKGROUND OF THE INVENTION

1. Field of the Invention

The present invention relates to a securing arrangement for transporting and mounting a measuring system used for the determination of the position of two components, which can be moved relative to each other. The present invention further relates to such a measuring system.

2. Discussion of Related Art

Such a securing arrangement is used to fix the scanning device in a defined position (desired position) on the support body of the measuring system during the transport and mounting of the measuring system.

A securing arrangement for transporting and mounting a measuring system of the type mentioned at the outset is known from DE 199 18 654 A1. There, the measuring system includes a linearly extending measuring graduation, a support body bearing the measuring graduation, a scanning device scanning the measuring graduation, which is guided at a defined distance from the measuring graduation, and a mounting base, which is connected with the scanning device for fastening it on one of the two components which are movable in relation to each other. In particular, the two components, which are movable in relation to each other, can be the carriage and the associated bed of a machine tool. The support body with the measuring graduation on the one hand, and the mounting base with the scanning device on the other hand, are respectively fastened to one of the components of the machine tool. The securing arrangement itself has at least a base body, which can be linearly displaced along a guide track of the support body, and a guide element, which is releasably connected with the base body and interlockingly enters into the guide track of the support body, by which the base body of the securing arrangement can be clamped in place on the support body of the measuring graduation for maintaining the mounting base in a defined desired position on the support body during transport and mounting of the measuring system.

A service element in the form of an adjusting screw is used for introducing the force by which the securing arrangement can be clamped in place on the support body of the measuring graduation. Its screw head is arranged on the surface of the base body facing away from the support body and is intended to be operated in the customary manner by a tool. However, here the problem arises that at the end of the mounting of the measuring system on the machine tool the adjusting screw is often hardly accessible to a tool, for example because projecting edges of the machine tool greatly limit the available space. Access is further limited if the surface of the base body on which the screw head of the adjusting screw is arranged faces downward after the measuring system has been mounted. Thus, the release of the adjusting screw, and therefore the clamped connection between securing arrangements and the support body, which must take place at the termination of the mounting of the measuring system on a machine tool in order to release the scanning unit for a movement in relation to the support body of the measuring graduation, is made more difficult.

In a further securing arrangement of the type mentioned at the outset, known from DE 30 20 003 C2, the screw head of the adjusting screw is accessible to an operating tool from the side. However, the spatial arrangement of the adjusting screw required for this cannot be used in connection with a particularly advantageous embodiment of the clamping mechanism of the securing arrangement such as is known from DE 199 18 654 A1.

OBJECTS AND SUMMARY OF THE INVENTION

An object of the present invention is based on creating a securing arrangement of the type mentioned at the outset, whose clamped connection with the support body of a measuring graduation can be released in a simple manner, even after the measuring arrangement has been mounted on a machine tool.

This object is attained by the creation of a securing arrangement for transporting and mounting a measuring system used for the determination of the position of two components, which can be moved relative to each other. The securing arrangement includes a base body, which is linearly displaced along a displacement direction via a guide track of a support body of a measuring graduation of the measuring system and is fixed in place on the support body by clamping forces in order to maintain a mounting base that fastens a scanning device to one of the two components in a desired position in relation to the support body. A service element is provided on the base body and having an operating section for introducing and/or canceling the clamping forces, wherein the operating section of the service element laterally protrudes past a surface of the base body which faces away from the support body and is laterally bordered by a lateral edge, when the base body is fastened on the support body.

The object is also attained by the creation of a securing arrangement for transporting and mounting a measuring system used for the determination of the position of two components, which can be moved relative to each other. The securing arrangement includes a base body, which is linearly displaced along a guide track of a support body and is fixed in place on the support body by clamping forces in order to maintain said base body in a desired position in relation to the support body. A screw with knurling provided on the base body for introducing the clamping forces, wherein the knurling of the screw laterally protrudes past a surface of the base body, which faces away from the support body and is laterally bordered by a lateral edge, when the base body is fastened on the support body.

It is a further object of the present invention to provide a measuring system for determining the position of two components, which are movable in relation to each other.

This object is attained by a measuring system for determining the position of two components, which can be moved relative to each other, the measuring system including a measuring graduation extending in a measuring direction and a support body for the measuring graduation. A scanning device scans the measuring graduation, which is guided at a defined distance from the measuring graduation, and a mounting base for fastening the scanning device on one of the two components, which are movable with respect to each other. A securing arrangement including a base body, which is linearly displaced along a guide track of the support body and is fixed in place on the support body by clamping forces in order to maintain the mounting base in a desired position in relation to the support body. A service element provided on the base body and having an operating section for introducing and/or canceling the clamping forces, wherein the operating section of the service element laterally protrudes past a surface of the base body which faces away from the support body and is laterally bordered by a lateral edge, when the base body is fastened on the support body.

In accordance with this, the operating section of the service element (for example an adjusting screw) required for introducing the clamping forces at least projects laterally past the side edge of the surface of the base body of the securing arrangement facing away from the support body when the base body has been clamped in place on the support body.

The attainment of the object in accordance with the present invention has the advantage that the operating section intended for operating the service element is accessible in a simple manner when the clamped connection between the base body of the securing arrangement and the support body of the measuring graduation is to be released. The release of the clamped connection by operating the service element is considerably eased by this, in particular if there is only little space available above, or below, (depending on the installed position of the measuring system) the operating element.

In a preferred embodiment of the present invention, the service element for introducing, or canceling, the clamping forces (i.e. for creating the clamped connection between the base body and the support body, or for releasing it) is rotatable. In this case, the axis of rotation of the service element extends essentially perpendicularly to the surface of the base body facing away from the support body.

The service element is preferably provided and designed for manual rotation by tangentially acting operating forces, without the use of a tool. This has the advantage that it is possible to do without the use of a tool when releasing the clamped connection.

In accordance with a variation, the operating section can be constituted by an operating knob provided with a knurl and preferably disk-like. In another variation the operating section is provided as a lever. Regardless of how the operating section is actually embodied, the lever ratios must be selected in such a way that the tangentially acting operating forces generate the greatest possible torque in order to make the manual release of the clamped connection easier. A sufficiently large diameter of the disk-like operating head, or a sufficiently great length, should be selected to this end.

The operation of the service element is made easier if the clamping forces required for producing the clamped connection can be generated, or cancelled, by a pivot movement of the operating section over less than 180°. Because of this the release of the clamped connection at the end of mounting the measuring system is accelerated.

In a further development of the present invention, the service element has, in addition to the preferably manually operable operating section, an engagement section, which is designed for operating the service element by a tool. Because of this it is possible to use a tool when clamping the securing arrangement to the support body of the measuring graduation. Since the measuring system is here freely accessible, as a rule there are no restrictions regarding the use of a tool when making the clamped connection. During the subsequent release of the clamped connection following mounting of the measuring system on the support body of the measuring graduation, the clamped connection is released, as described above, by the manual operation of the operating section of the service element intended for this.

In accordance with an embodiment of the present invention, the service element has a screw thread, to which a counter-screw thread of the securing arrangement is assigned and whose pitch preferably is of such a size that the clamping forces required for making the clamped connection can be introduced, or cancelled, by a rotary movement of the service element over an angle of less than 180°. The screw thread can act in a self-cutting manner, so that the corresponding counter-screw thread is only provided when the screw is turned in.

The service element can for example be constituted by a screw or a rotary lock, wherein in the latter case a corresponding coarse screw thread is assigned as the counter-screw thread.

Alternatively to a screw, it is possible to use a snap-in element as the service element, for example for providing a snap connection in the manner of a quarter-turn fastener. Here, the clamping forces, which cause the fixing of the securing arrangement on the support body of the measuring graduation, are created when the snap-in element snaps in.

In general, service elements having at least one wedge element for creating clamping forces are suitable for introducing the clamping forces.

Another preferred further development of the present invention is distinguished in that the securing arrangement includes a guide element, which is releasably connected with the base body and interlockingly enters into the guide track of the support body and can be clamped to the support body.

This embodiment of the securing arrangement has the advantage that it makes possible a very solid, essentially rigid, fixation of the scanning device on the support body via the securing arrangement in that the guide element of the securing arrangement is fastened by appropriately sized clamping forces on the support body. At the same time, following the end of mounting it is possible to remove the securing arrangement very simply from the support body by releasing the connection between the base body and the guide element of the securing arrangement. Then the base body can be easily removed from the support body. The guide element either remains in the associated guide track of the support body, or is removed from it. In the latter case, it is easily possible to provide that the guide element is additionally movably connected with the base body by a flexible strip, for example a flexible plastic strip or a film hinge. This additional connection must permit a sufficient mobility of the guide element in regard to the base body in order to be able to remove the former, for example by tilting, from the guide track of the support body after the clamped connection has been released.

Reference is made with respect to further details of this further development of the present invention to DE 199 18 654 A1. Its technical teaching can be combined to its full extent with the present invention.

In a preferred embodiment, the securing arrangement includes two separate base bodies which, spaced apart from each other in the displacement direction, are arranged on respectively one of the front ends of the mounting base of the scanning device. In this case, each one of the two base bodies can have its own guide element assigned to it. On the other hand, it is possible to rigidly connect the two base bodies via a common guide element. In the first mentioned case it is possible to achieve a rigid arrangement of the two base bodies with respect to each other by an additional hoop connecting both base bodies with each other. In the second case mentioned, a secure support on both sides of the mounting base in its desired position is made possible by only three components. Here, the guide element additionally takes on the function of the securing hoop.

Further characteristics and advantages of the invention will become apparent in the course of the following description of an exemplary embodiment, making reference to the drawings.

BRIEF DESCRIPTION OF THE DRAWINGS

FIG. 1 is a lateral view of an embodiment of a measuring system with an embodiment of a securing arrangement for maintaining a mounting base of the measuring system in a defined desired position in accordance with the present invention;

FIG. 2 is a cross-sectional view through the measuring system of FIG. 1 in the area of the mounting base;

FIG. 3 is a cross-sectional view through the measuring system of FIG. 1 in the area of a base body of the securing arrangement;

DETAILED DESCRIPTION OF THE PREFERRED EMBODIMENTS

Figure 4A:
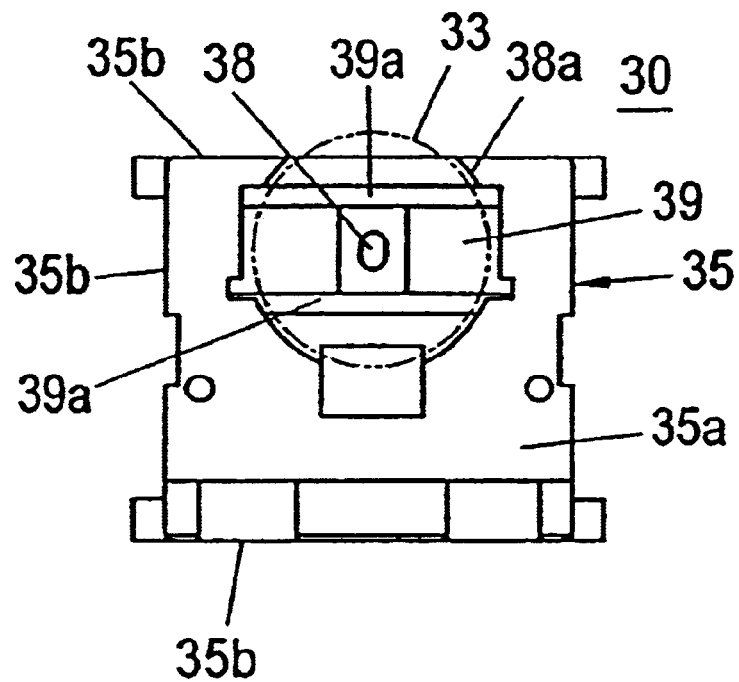
FIG. 4a is a top view of a base body of the securing arrangement of FIG. 1.

A measuring system used for the determination of the position of two components, which can be moved relative to each other, of a machine tool is represented in FIG. 1, which includes a support body 1, a scanning device 2 and a securing arrangement 3, by which the scanning device 2 can be maintained in a defined desired position on the support body 1. Here, the leg 13 of the support body 1, which in the viewing direction I (see FIGS. 2 and 3) is in front, is not represented in order to provide a free view of the interior of the support body 1.

FIGS. 2 and 3 each show a cross section through the measuring system of FIG. 1 in the area of a mounting opening 9b, or a mounting opening 9a. In this case, for reasons of clarity only the components of the scanning device 2 and partial sectional views of the movable portions of a machine tool, namely the carriage 50 and the base 51, are represented, besides the components of the support body 1 in FIG. 2. The components of the securing arrangement 3 are also shown in FIG. 3.

In accordance with FIGS. 1 and 2, the support body 1 includes a linearly extending hollow profiled section 10 with a base 11, from which two lateral legs 12, 13 extend essentially perpendicularly. This hollow profiled section 10 surrounds an inner hollow chamber 14, in which a measuring graduation 5 extending in the measuring direction is arranged, and which is accessible from the outside through a slit 15 closed by elastic sealing lips 6. On both its ends the hollow profiled section 10 is provided with lateral closure elements 7, 8, and on its top it has a mounting strip with openings 9a to 9d for fastening the support body 1 on a machine component, for example the carriage 50 of a machine tool.

The scanning carriage 23 of a scanning device 2 is arranged, linearly displaceable, inside the hollow profiled section 10, and has a light source 24, a lens system 25 and photoelectrical elements 26 for scanning the optical measuring graduation 5. The scanning carriage 23 is resiliently, but rigidly in the displacement direction V, connected by a driver 22 with a mounting base 20 arranged outside the hollow chamber 14. The mounting base 20 is used for fastening the scanning device 2 to a second machine component, for example the bed 51 of the above-mentioned machine tool. The mounting base 20 has passages 21 for this purpose.

A measuring system of the type described above is generally known and therefore need not be explained in detail here regarding its functioning.

It can be seen by FIGS. 1 and 3 that the measuring system moreover has a securing arrangement 3 connected to the mounting base 20. This securing arrangement 3 includes two base bodies 30, which are arranged on the two front faces of the mounting base 20 and are spaced apart from each other in the displacement direction V and are provided with pins which enter into the associated recesses 28 of the mounting base 20.

Each of the two base bodies 30 of the securing arrangement 3 has a guide element 31, which is fastened via respective connector 32 (service element) in the form of a screw on the respective base body 30. In this case the screws 32 extend through passages in the base bodies 30 and have been screwed into an associated screw thread of the respective guide element 31.

It furthermore becomes clear from FIG. 3 that the guide elements 31 of the securing arrangement 3 are guided in a guide track 16 of the hollow profiled section 10, which is embodied as a dovetailed groove and has a protrusion 17 forming an undercut. The guide element 31 is interlockingly maintained in the dovetailed groove 16 by this undercut. But a T-groove, or an L-groove, for example, is also suitable as guide elements in place of a dovetailed groove.

The base bodies 30 of the securing arrangement 3 include brackets 36 on respectively both sides, by which the distance of the mounting base 20 from the support body 1 transversely with respect to the displacement direction V can be fixed. Moreover, a leg 37 projects perpendicularly from the base 35 of each base body 30, which is supported on an oppositely located leg 12 of the base body 1 by a tongue-and-groove guide 19.

Accordingly, the base bodies 30 of the securing arrangement are arranged in a linearly displaceable manner on the support body 1 on the one hand by the guide element 31 arranged in the dovetailed groove 16, and on the other hand by the tongue-and-groove guide 19. In place of separate guides it is also possible to provide a common guide element for both base bodies 30 through which the two base bodies 30 are rigidly connected with each other. When using separate guide elements, the two base bodies 30 of the securing arrangement 3 can be additionally connected with each other by lateral hoops.

The receivers 18 for the sealing lips 6 of the support body 1 can additionally be recognized in FIG. 3, since there the sealing lips are not represented for reasons of clarity.

When the two base bodies 30 of the securing arrangement 3 are comparatively loosely connected with the respectively associated guide elements 31 by the screws 32, the securing arrangement 3, together with the scanning device 2, can be displaced in the direction V on the base body 1. Once the scanning device has reached a defined, predeterminable desired position on the support body 1, it can be arrested in this desired position by firmly tightening the screws 32 used for connecting the base body 30 and the guide element 31. By this the guide elements are clamped in a force-locked or frictional manner in the dovetailed groove 16, wherein the clamping forces act transversely with respect to the displacement direction V. Based on the clamping forces caused by tightening the two screws 32, a beveled section of the respective guide element 31 comes to rest against a corresponding section of the protrusion 17 of the hollow profiled section 10, which constitutes an undercut in the dovetailed groove 16. Therefore, a very strong clamped connection between the securing arrangement 3 and the support body 1 is created here.

Because of the additional lateral support of the base bodies 30 via respectively a lateral leg 37 and a tongue-and-groove guide 19 on a leg 12 of the support body, the connection between the securing arrangement 3 and the support body 1 is moreover designed to be tilt-proof.

It is furthermore possible here to achieve a positioning, essentially free of play, of the securing arrangement 3, and therefore also of the scanning device 2, because the guide element can be made of a very hard material. Since the guide elements 31 and the base body 30 of the securing arrangement 3 are embodied as separate components which are releasably connected with each other, it is not required to design the guide elements 31 so elastically that they can be taken out of the dovetailed groove 16 together with the base body 30 for removing the securing arrangement 3 from the support body 1.

Rather, the securing arrangement 3 is removed from the support body 1 in that first the two screws 32 are loosened and the base bodies 30 are removed. In this case, the guide elements 31 can remain in the dovetailed groove 16. It is alternatively possible to design the guide elements 31 in such a way that they can be removed from the dovetailed groove 16 by tilting after the base bodies 30 have been released. But such tilting is only possible after the removal of the base bodies 30, which are supported by the tongue-and-groove connection on a leg 12 of the support body 1 and therefore prevent the tilting of the securing arrangement 3. In this case, the guide elements can additionally be movably connected with the base body 30 by sufficiently flexible plastic strips or a film hinge.

Figure 4B:
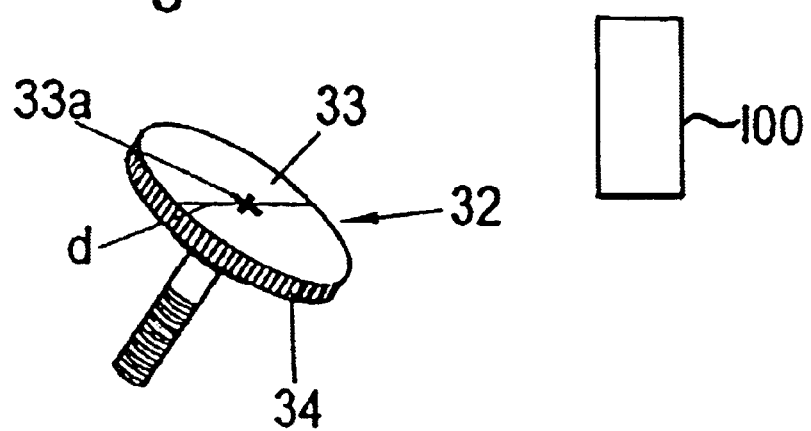
FIG. 4b is a perspective representation of an embodiment of a screw for the base body of FIG. 4a, which is used as an operating device in accordance with the present invention.

In this case, the disk-shaped head 33 of the screws 32 has a diameter of sufficient size so that it laterally projects past the lateral outer edge 35b of the surface 35a, facing away from the support body 1, of the base 35 of the respective base body 30, see FIGS. 4a and 4b. This allows an operation of the screws 32 from the side, for which purpose the screw heads 33 are additionally equipped with a knurling 34. Further details of this will be explained further down by FIGS. 4a and 4b.

Altogether, because of its multi-part design the securing arrangement 3 makes possible a rigid connection, free of play, with the support body 1, so that it is accordingly also possible to maintain the scanning device 2, which is connected with the securing arrangement 3, free of play in a defined desired position on the support body 1. Because of this it is possible to align the two machine components, which are movable with respect to each other and are to be connected with the measuring system, by the exactly set relative position of the support body 1 and the scanning device 2. After this has taken place and the support body 1, as well as the mounting base 20 of the scanning device 2, have respectively been connected with one of the two machine components, the securing arrangement 3 is removed from the support body 1 in the above described manner by operating the screws 32.

FIG. 4a shows a view from above on one of the base bodies 30 of the securing arrangement 3 in FIGS. 1 to 3, namely on the surface 35, facing away from the support body 1 (see FIG. 1), of the base 35 of the appropriate base body 30.

In the view from above, the base, and therefore also its surface 35a, has a rectangular shape, which is bordered by an outer edge 35b. The base 35 of the base body 30 is provided with a strip 39, which is laterally separated from the remainder of the base body by two slits 39a. A passage 38 for receiving one of the screws 32 (see FIGS. 1 to 3) is provided in this strip 39, by which the base body 30 can be connected with a guide element of the securing arrangement and can be clamped on the support body of the measuring graduation.

The strip 39, which is bordered by two lateral slits 39a, causes some elasticity of the base body 30 in the area of the passage 38. A circular cutout 38a, which surrounds the passage 38, is provided in the surface 35a of the base 35 of the base body 30 and is used for receiving the head of a knurled screw 32 of the type represented in FIG. 4b.

In accordance with FIG. 4b, the knurled screw 32 has a disk-shaped screw head 33 of a diameter d of such a size that the screw head 33 projects laterally past the outer edge 35b of the base body 30, and preferably also past the lateral leg 13 of the support body 1, which is visible in FIG. 3, also see FIG. 4a in this regard, in which the dimensions of the screw head 33 are indicated by a dashed line. By this the screw 32 can be operated in a simple manner from the side in that a tangentially acting operating force is applied to the edge of the screw head 33. Since the edge of the screw head 33 is provided with knurling 34, a manual operation of the screw 32 is easily possible. Because of the large diameter d of the screw head 33, and of the lever effect connected with this, the torque to be provided for loosening the screw 32 can be generated by comparatively small tangential forces. This increases the ease of a manual operation of the screw 32. In this case it is additionally possible to indicate the direction of rotation provided for loosening the screw 32 by an arrow P applied to the outer edge 35b of the base body 30, see FIG. 1.

In conclusion, the embodiment of the disk-shaped screw head 33, in particular the fact that it projects past the lateral outer edge 35b of the base 35 of the base body 30, therefore allows a simple lateral operation of the screw 32 for releasing the clamped connection between the securing arrangement 3 and the support body 1, see FIG. 1. This is particularly advantageous when the cover surface of the screw head 33 is hard to access after the installation of the measuring system 1, 2, together with the securing arrangement 3 (see FIG. 1) in a machine tool.

But this problem does not exist at the time of the fixation of the securing arrangement 3 on the measuring system 1, 2 which, as a transport and mounting securing device, does take place prior to the mounting of the measuring system 1, 2 on a machine tool. For this reason the cover surface of the screw head 33 is additionally provided with a cross slit 33a, which permits the operation by a tool 100 when making the clamped connection between the securing arrangement 3 and the support body 1. Note that tool 100 is drawn as a box in FIG. 4b in order to represent a tool in general to interact with cross slit 33a and is not intended to denote any particular type of tool.

The foregoing description is provided to illustrate the invention, and is not to be construed as a limitation. Numerous additions, substitutions and other changes can be made to the invention without departing from its scope as set forth in the appended claims.

We claim:

1. A securing arrangement for transporting and mounting a measuring system used for the determination of the position of two components which can be moved relative to each other, wherein said securing arrangement comprises:
   a base body, which is linearly displaced along a displacement direction via a guide track of a support body of a measuring graduation of said measuring system and is fixed in place on said support body by clamping forces in order to maintain a mounting base that fastens a scanning device to one of said two components in a desired position in relation to said support body;
   a service element provided on said base body and having an operating section for introducing and/or canceling said clamping forces;
   wherein said operating section of said service element laterally protrudes past a surface of said base body which faces away from said support body and is laterally bordered by a lateral edge, when said base body is fastened on said support body.

2. The security arrangement in accordance with claim 1, wherein said operating section of said service element is operated from a side of said base body.

3. The security arrangement in accordance with claim 1, wherein said operating section of said service element is arranged on said surface of said base body facing away from said support body.

4. The security arrangement in accordance with claim 1, wherein said service element is rotatable about an axis of rotation for introducing and/or canceling said clamping forces.

5. The security arrangement in accordance with claim 4, wherein said clamping forces required for providing said clamped connection can be created and/or cancelled by a pivot movement of said operating section over less than 180°.

6. The security arrangement in accordance with claim 4, wherein said axis of rotation of said service element extends essentially perpendicular in relation to a section of said surface, which faces away from said support body, of said base body.

7. The security arrangement in accordance with claim 6, wherein said service element is provided and embodied to be rotated by tangentially acting operating forces.

8. The security arrangement in accordance with claim 1, wherein said operating section is embodied for direct manual operation without the use of tools.

9. The security arrangement in accordance with claim 8, wherein said service element comprises an additional engagement section, which is embodied for operating said service element by a tool.

10. The security arrangement in accordance with claim 1, wherein said operating section comprises an operating head provided with knurling.

11. The security arrangement in accordance with claim 1, wherein said operating section comprises a lever.

12. The security arrangement in accordance with claim 1, wherein said service element comprises a screw thread.

13. The security arrangement in accordance with claim 12, wherein said screw thread has a pitch such that said clamping forces required for providing the clamped connection can be introduced and/or cancelled by a rotating movement of said service element over less than 180°.

14. The security arrangement in accordance with claim 12, wherein said service element comprises a screw.

15. The security arrangement in accordance with claim 1, further comprising a guide element, which is connected via said service element with said base body and interlockingly enters into said guide track of said support body and is clamped in place on said support body.

16. The security arrangement in accordance with claim 1, wherein said clamping forces essentially act transversely with respect to said displacement direction.

17. The security arrangement in accordance with claim 1, further comprising a second base body, which is spaced apart from said base body in said displacement direction, respectively on a front face of said mounting base.

18. The security arrangement in accordance with claim 17, wherein said base body and said second base body are each assigned its own guide element.

19. The security arrangement in accordance with claim 17, wherein said guide element connects said base body and said second base body with each other.

20. A securing arrangement for transporting and mounting a measuring system used for the determination of the position of two components which can be moved relative to each other, wherein said securing arrangement comprises:
   a base body, which is linearly displaced along a guide track of a support body and is fixed in place on said support body by clamping forces in order to maintain said base body in a desired position in relation to said support body;
   a screw with knurling provided on said base body for introducing said clamping forces,
   wherein said knurling of said screw laterally protrudes past a surface of said base body which faces away from said support body and is laterally bordered by a lateral edge, when said base body is fastened on said support body.

21. The securing device in accordance with claim 20, wherein said screw comprises an additional engagement section, which is embodied for operation of said screw by a tool.

22. A measuring system for determining the position of two components which can be moved relative to each other, said measuring system comprising:
   a measuring graduation extending in a measuring direction;
   a support body for said measuring graduation;
   a scanning device scanning said measuring graduation, which is guided at a defined distance from said measuring graduation, and a mounting base for fastening said scanning device on one of said two components which are movable with respect to each other; and
   a securing arrangement comprising:
      a base body, which is linearly displaced along a guide track of said support body and is fixed in place on said support body by clamping forces in order to maintain said mounting base in a desired position in relation to said support body;
      a service element provided on said base body and having an operating section for introducing and/or canceling said clamping forces;
      wherein said operating section of said service element laterally protrudes past a surface of said base body which faces away from said support body and is laterally bordered by a lateral edge, when said base body is fastened on said support body.

* * * * *